US012715127B2

(12) United States Patent
Berg et al.

(10) Patent No.: US 12,715,127 B2
(45) Date of Patent: Aug. 25, 2026

(54) FEATURE INTERFACES FOR REAL-TIME ROBOTICS CONTROL

(71) Applicant: Intrinsic Innovation LLC, Mountain View, CA (US)

(72) Inventors: Nils Berg, Karlsruhe (DE); Andre Gaschler, Munich (DE)

(73) Assignee: Intrinsic Innovation LLC, Mountain View, CA (US)

( * ) Notice: Subject to any disclaimer, the term of this patent is extended or adjusted under 35 U.S.C. 154(b) by 187 days.

(21) Appl. No.: 18/531,408

(22) Filed: Dec. 6, 2023

(65) Prior Publication Data

US 2024/0217100 A1 Jul. 4, 2024

Related U.S. Application Data

(60) Provisional application No. 63/436,432, filed on Dec. 30, 2022.

(51) Int. Cl.
*B25J 9/16* (2006.01)

(52) U.S. Cl.
CPC .................................. *B25J 9/1661* (2013.01)

(58) Field of Classification Search
None
See application file for complete search history.

(56) References Cited

U.S. PATENT DOCUMENTS 9,829,890 B2 * 11/2017 Bostick .................. G01S 19/47
9,868,212 B1 * 1/2018 Hinterstoisser ........ B25J 9/1671
11,188,821 B1 * 11/2021 Kalakrishnan ........... G06N 3/08
11,571,809 B1 * 2/2023 Bodnar .................. B25J 9/1612
2008/0141220 A1 * 6/2008 Kim ....................... B25J 9/1661 901/50
2017/0176995 A1 * 6/2017 Bostick ................... G06F 1/163
2018/0167278 A1 * 6/2018 Holmes ............... H04L 41/0846
2018/0344114 A1 * 12/2018 Scholten .................. G05D 1/03
2020/0368913 A1 * 11/2020 Scott ....................... B25J 19/023
2021/0049037 A1 * 2/2021 Kattepur ................ B25J 9/1661
2022/0347846 A1 11/2022 Gaschler et al.
2024/0217099 A1 * 7/2024 Niemueller ............ B25J 9/1671
2024/0217100 A1 * 7/2024 Berg ...................... B25J 9/1661

FOREIGN PATENT DOCUMENTS

CN 119458330 A * 2/2025 .......... B25J 19/0095
KR 102473630 B1 * 12/2022 ............. G06Q 50/08
KR 102558767 B1 * 7/2023 ............. G05D 1/247

OTHER PUBLICATIONS

KR-102558767-B1 translation (Year: 2023).*
KR-102473630-B1 translation (Year: 2022).*
CN-119458330-A translation (Year: 2025).*

* cited by examiner

*Primary Examiner* — Kyle T Johnson
(74) *Attorney, Agent, or Firm* — Fish & Richardson P.C.

(57) ABSTRACT

Methods, systems, and apparatus, including computer programs encoded on computer storage media, for using feature interfaces for real-time robotics control. One of the methods includes receiving a definition of a real-time action to be executed by the real-time robotics control system to control a robot using one or more underlying hardware subsystems. The real-time action is invoked including providing a respective part identifier of a part for each of the one or more feature interfaces called by the real-time action.

20 Claims, 4 Drawing Sheets

Figure 2:
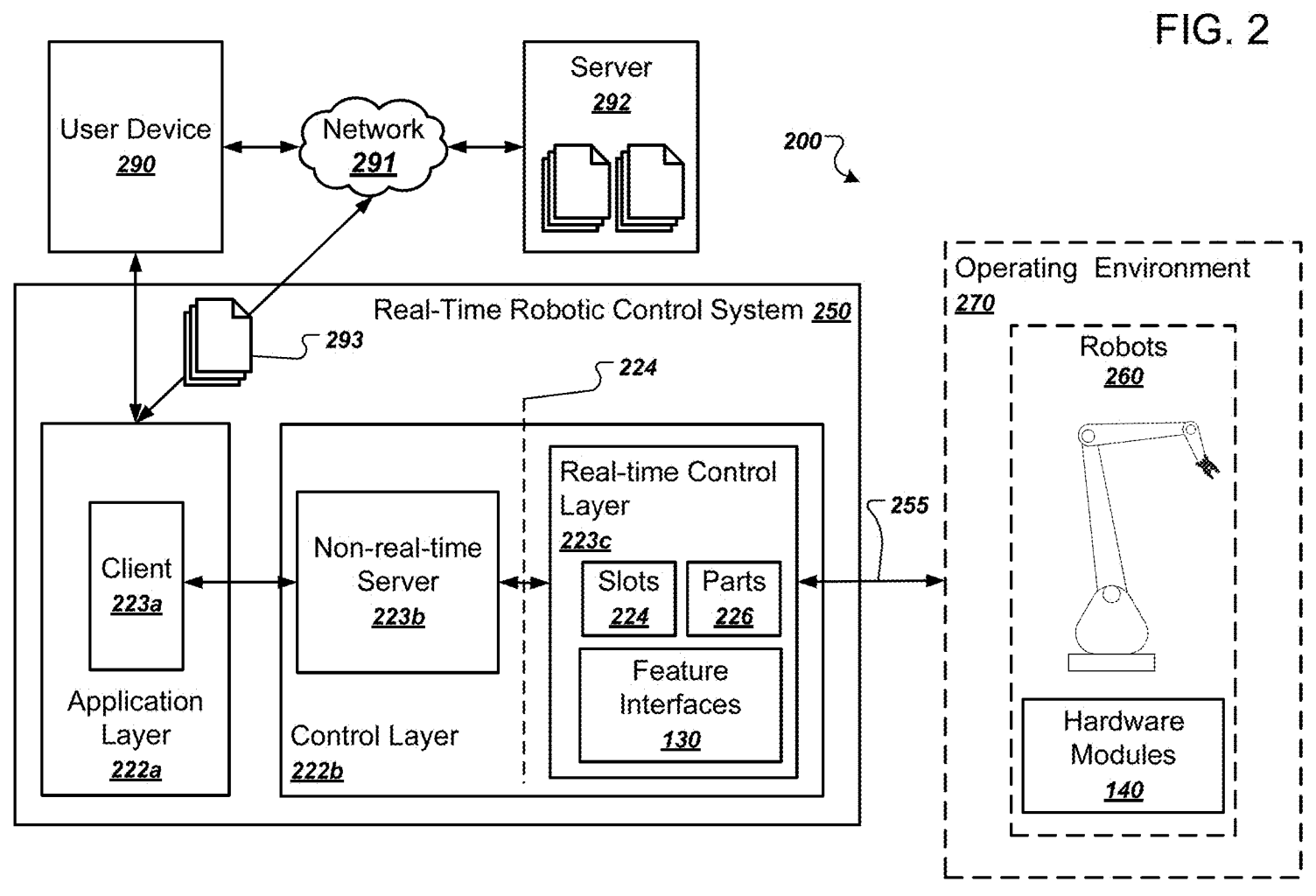

User Device 290

Network 291

Server 292

293

Real-Time Robotic Control System 250

Client 223a

Application Layer 222a

Non-real-time Server 223b

Control Layer 222b

224

Real-time Control Layer 223c

Slots 224

Parts 226

Feature Interfaces 130

255

Operating Environment 270

Robots 260

Hardware Modules 140

FEATURE INTERFACES FOR REAL-TIME ROBOTICS CONTROL

CROSS-REFERENCE TO RELATED APPLICATIONS

This application claims priority to U.S. Provisional Application No. 63/436,432, filed Dec. 30, 2022, the contents of which are incorporated herein by reference in their entirety.

BACKGROUND

This specification relates to controlling robotic devices.

Real-time robotics control systems are systems that must execute within strict timing requirements to achieve normal operation. The timing requirements often specify that certain actions must be executed or outputs must be generated within a particular time window in order for the system to avoid entering a fault state. In the fault state, the system can halt execution or take some other action that interrupts normal operation.

Such real-time robotic control systems are often used to control physical machines that have high precision and timing requirements. As one example, a workcell of industrial robots can be controlled by a real-time robotic control system that requires each robot to repeatedly receive commands at a certain frequency, e.g., 1, 10, or 100 kHz. If one of the robots does not receive a command during one of the periodic time windows, the robot can enter a fault state by halting its operation or by automatically executing a recovery procedure to return to a maintenance position.

Robotics control systems can include a plurality of hardware modules that can each perform different actions. Some actions assigned to a robotics control system are complex in nature and require more than one hardware module to execute over several steps.

Real-time software is often developed for a particular robot model and once developed, cannot be easily executed for a different robot model. This is because the real-time software is often highly intertwined with the specifics of the underlying hardware in a way that makes the code incompatible with other systems. Therefore, there is a lot of duplicated effort to implement the same robotic process on different types of robots.

SUMMARY

This specification describes a real-time robotics system that uses feature interfaces in order to separate routines that govern real-time control from the details of the hardware devices that implement the functionality. In a sense, the feature interfaces make the control software independent of any particular robot or sensor model. Instead, the system can perform real-time control using hardware agnostic real-time actions that drive the hardware modules through the feature interfaces.

The feature interfaces represent functionality that can be effectuated by one or more underlying hardware subsystems, e.g., a robot, a conveyor belt, or a sensor, to name just a few examples. The feature interfaces are implemented by parts, which in this specification refers to real-time software modules that are abstractions of hardware components. By supplying different part identifiers when the real-time action is invoked, the system can use the same real-time action for any arbitrary number of different underlying robotic systems.

Particular embodiments of the subject matter described in this specification can be implemented so as to realize one or more of the following advantages. Using feature interfaces separates the definition of a real-time action from the hardware-specific actions that effectuate the real-time action. Therefore, real-time actions can be entirely hardware-agnostic and used for and extended to a variety of different types of robots manufactured by a variety of different entities. The feature interfaces thus make real-time control software more modular and extensible. In addition, the organization of feature interfaces into slots provides for an automatic mechanism for checking compatibility of hardware devices and real-time actions.

The details of one or more embodiments of the subject matter of this specification are set forth in the accompanying drawings and the description below. Other features, aspects, and advantages of the subject matter will become apparent from the description, the drawings, and the claims.

BRIEF DESCRIPTION OF THE DRAWINGS

FIG. 2 is a diagram of an example system.

Like reference numbers and designations in the various drawings indicate like elements.

DETAILED DESCRIPTION

Figure 1:
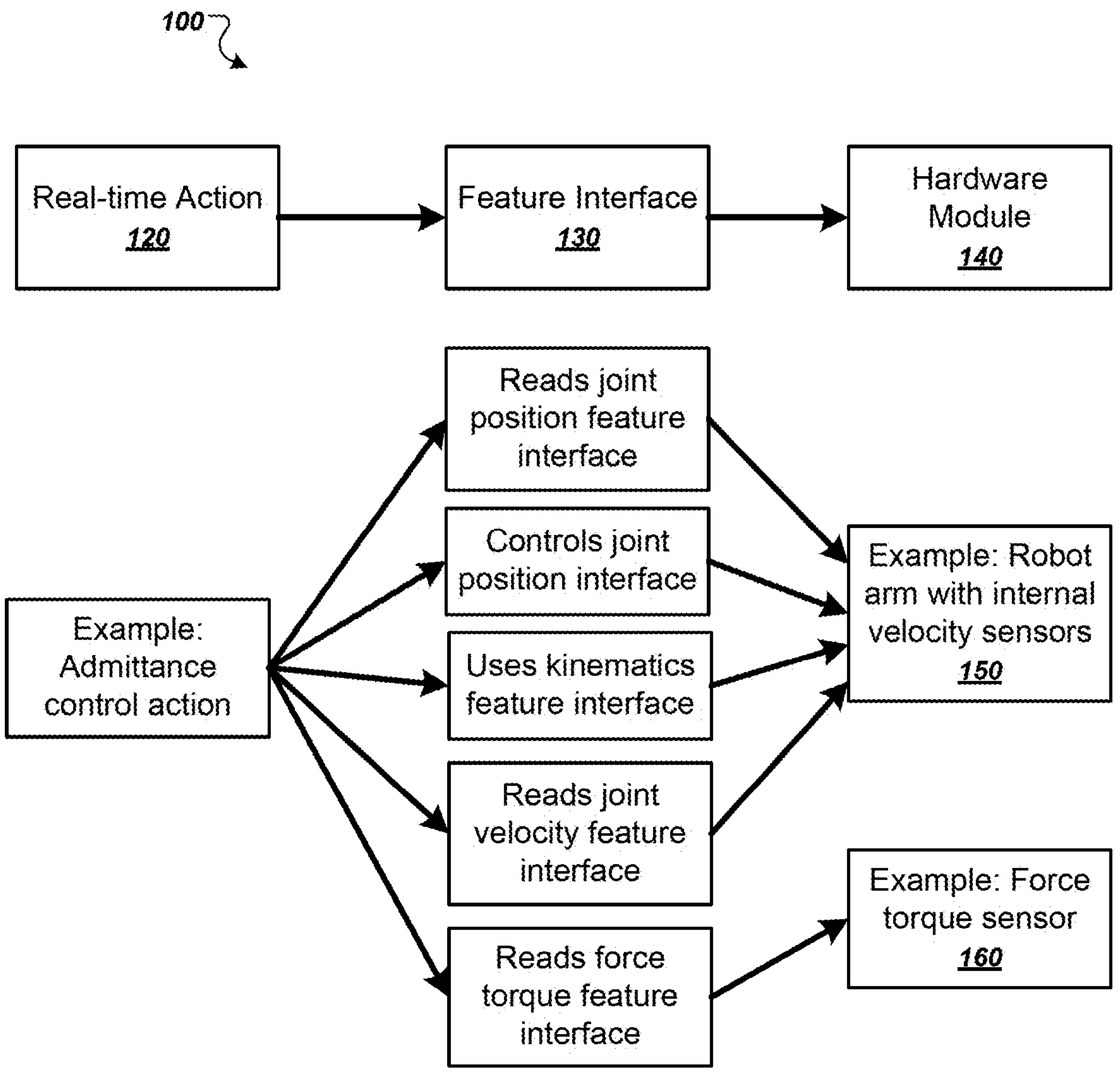
FIG. 1 is a diagram of how feature interfaces map requirements of real-time actions to hardware modules.

FIG. 1 is a diagram of how feature interfaces map requirements of real-time actions to hardware modules. This separation using feature interfaces means that the code of the real-time actions does not need to be tied to any particular robot or sensor or other hardware module. Thus, the same real-time control action can be executed for a variety of robots that implement the functionality represented by the feature interfaces.

In simple cases, the functionality represented by each feature interface can be implemented by a separate hardware module, for example, a real-time action that specifies inserting an electronic connector into an opening. In some cases, this action 120 can require force sensor, joint position sensor, and velocity sensor readings. The real-time action can thus use the feature interfaces for separate hardware modules that implement the required functionality.

FIG. 1 illustrates an example of feature interfaces used by a real-time admittance control action. The feature interfaces 130 required to perform the real-time action 120 are implemented by hardware modules 140. As illustrated in FIG. 1, the real-time action 120 is an admittance control action that relies on the following features: obtaining joint position sensor values, obtaining force-torque sensor values, kinematics computations, and joint velocity sensor values in order to control a joint position. Different hardware modules can implement the functionality of the feature interfaces relied upon by the real-time action 120.

For example, a single sophisticated robot arm might have all the sensors required to implement the real-time admittance control action. In this case, the feature interfaces map requirements of the real-time action 120 to software modules for the robot arm that implement the functionality of the feature interfaces.

In contrast, and as illustrated in FIG. 1, another, less-sophisticated robot arm might include hardware sufficient to implement the necessary functionality to obtain joint position, joint velocity, and kinematics, but might not have a force-torque sensor. In that case, a separate force-torque sensor can be mounted on the robot arm, and the feature interface for that functionality will be mapped to the separate force-torque sensor.

Regardless of the hardware used in either of these two scenarios, the feature interfaces allow the real-time admittance control action 120 to remain the same. The only thing that changes is how higher-level calling code invokes the real-time admittance control action. In the case of the sophisticated robot, the calling code can pass a name of the robot arm as the hardware module that will implement all of the required features. In the case of the less-sophisticated robot arm, the calling code can pass a name of the robot arm for all feature interfaces except for the force-torque feature interface, which will be passed the name of the separately mounted force-torque sensor.

This diagram also illustrates how to automatically determine whether a set of hardware components is compatible with a real-time action. In particular, the hardware components are compatible if and only if they implement all the feature interfaces required by the real-time action. Thus, a system could for example automatically determine that the less sophisticated robot, on its own, is not compatible with the real-time admittance control action because it does not implement the feature interface for reading force-torque sensor values.

FIG. 2 is a diagram of an example system 200. The system 200 includes a real-time robotic control system 250 to drive one or more robots 260 in an operating environment 270. The system 200 includes a number of functional components that can each be implemented as computer programs installed on one or more computers in one or more locations that are coupled to each other through any appropriate communications network 291, e.g., an intranet or the Internet, or combination of networks.

The system 200 is an example of a system that can implement the real-time robotics control framework as described in this specification. In particular, the system 200 can provide a unified framework that allows users to achieve multiple different types of real-time control. In this specification, a robotic control system being described as being “real-time” means that it is required to execute within strict timing requirements to achieve normal operation. The timing requirements specify that certain actions must be executed, or outputs that must be generated, within a particular time window in order for the system to avoid entering a fault state. For brevity, each time window may be referred to as a tick or a control tick. In the fault state, after a tick has elapsed without completing its required computations or actions, the system can halt execution or take some other action that interrupts normal operation, e.g., returning the robots to a starting pose or a fault pose.

Operations performed on the non-real-time side of the system are generally not required to complete within a particular time period in order to be successful. In contrast, a real-time system requires deterministic operations, which are required to complete on every tick to avoid entering a fault state.

The real-time robotic control system 250 is configured to control the robots 260 in the operating environment 270 according to real-time control information. To control the robots 260 in the operating environment 270, the real-time robotic control system 250 provides commands, e.g., commands 255, to be executed by one or more robots, e.g., robots 260, in the operating environment 270.

In some implementations, a user of the system 200 can initiate the execution of the real-time action 120 by providing real-time control information to the real-time robotic control system 250. For example, a user can use a user device 290 to provide real-time control information to the application layer **222*a*. For example, through an integrated development environment (IDE) installed on the user device 290, the user can write code and create configuration files that facilitate the real-time control of the one or more robots to perform a real-time action 120**.

It should be noted that, while the description in this specification largely relates to real-time control of robot itself, the system 200 and the described techniques can also provide real-time control of other suitable equipment associated with the robot. For example, the user can similarly provide real-time control information that specifies how a sensor or tool (or end effector) in the workcell should operate at each tick of a real-time control cycle, either in tandem with or independently of a robot. Example sensors include distance sensors, force sensors, torque sensors, cameras, and the like. Example tools include grippers, conveyors, welding devices, gluing devices, sanding devices, and the like.

In some implementations, the real-time robotic control system 250 can then prepare the real-time control code for execution. Generally, the real-time robotic control system 250 can provide commands through a control stack 222 that handles providing real-time control commands 255 to the robots 260. The control stack 222 can be implemented as a software stack that is at least partially hardware-agnostic. In other words, in some implementations the software stack can accept, as input, commands generated by the control system 250 without requiring the commands to relate specifically to a particular model of robot or to a particular robotic component.

In some implementations, the control stack 222 includes multiple levels, with each level having one or more corresponding software modules. In FIG. 2, the lowest level is the control layer **222*b*, and the highest level is the application layer 222*a*. The application layer 222*a*** executes within non-real-time requirements, e.g., by providing a command at second, lower rate, which may sometimes be a varying rate or a rate that is sporadic, or both.

The control layer **222*b* handles bridging the boundary 224 between processes executing in non-real-time and processes executing in real-time. For example, the non-real-time commands generated by upper-level software modules in the control stack 222 are non-real-time processes, while the real-time commands generated by the lower-level software modules in the control stack 222 are executed by real-time processes. More details of the control stack 222** are described in commonly owned U.S. patent application Ser. No. 17/246,082, which is herein incorporated by reference.

In some implementations, the control layer **222*b* can include both a real-time control layer 223*c* and a non-real-time server 223*b* that collectively facilitate real-time control of a real-time action 120 from commands issued by the client 223*a*. The control layer 222*b*** serves as a bridging module in the control stack that translates each non-real-time command into data that can be consumed by real-time controllers that are responsible for generating low-level real-time commands. Such low-level real-time commands can, for example, relate to the actual levels of electrical current to be applied to robot motors and actuators at each point in time in order to effectuate the movements specified by the command.

In some implementations, upon being provided with the definition of the real-time action 120, the non-real-time server 223*b* in the control layer 222*b* can use this definition to initialize all the motion parameters for driving robots in the operating environment 270 and other state variables for real-time execution. For example, the non-real-time server 223*b* can preallocate memory and perform data format conversions between non-real-time data formats and real-time data formats. In the meantime, the real-time control layer 223*c* can use this definition to produce continuous real-time control signals including, e.g., real-time positions, velocities, or torques for a robot component such as a robot joint, which determine how to drive the motors and actuators of the robots 260 in order to effectuate the real-time action 120.

In some implementations, the real-time control layer 223*c* also includes a plurality of feature interfaces 130 that describe the functionality required to complete the real-time action 120. In some cases, these feature interfaces 130 correspond to the slots 224 present in the real-time action 120 and define functionality possessed by one or more hardware modules 140 of the robots 260 in the operating environment 270.

In some implementations, a feature interface can represent the functionality of a kinematics model for a particular robot. A kinematics model can control the movement of a hardware module 140 for a given input force, torque, or stimuli. For example, a kinematics module can specify that 10 Newton-meters of torque is required to achieve a 5 degree joint rotation in a robot part. One benefit of using feature interfaces is that they can hide proprietary implementations. In other words, the real-time action itself does not need to have access to any proprietary kinematics information for a particular robot. Rather, all proprietary information can be encapsulated in the part that implements a feature interface for a particular robot model.

The slots 224 are groupings that each define a set of feature interfaces required to be implemented by a part. Thus, a part can be considered to fit into a slot if the part implements all the feature interfaces required by the slot.

Thus, whether a part is compatible with a slot can be determined solely from the feature interfaces required by the slot and/or implemented by the part. Therefore, in some implementations, the system can automatically generate mappings between slots and parts that fit into those slots. This information can be used at run time or at staging time to ensure that the hardware that is invoked for a particular real-time action is compatible with the real-time action.

In some implementations, the system generates a mapping that can be referred to as a part-action pair 293. In some cases, a part-action pair 293 represents a set of parts 226 that are compatible to effectuate a real-time action 120. In some cases, part-action pairs 293 can be generated by the real-time robotics control system 250 and shared with external devices over a network 291, for example, user device 290 and server 292. These external devices can then store information relating to the part-action pairs 293 or view the slots 224 or parts 226 associated with the part-action pair 293.

In some implementations, portions of the part-action pair 293 can be inferred or omitted by the system 200. For example, in a joint position action 120 where the system 200 indicates that only a single part 226 is available in the form of a robot arm, the user can specify to the system to omit all other slots 224 and parts 226 from the part-action pair 293 since only a robot arm hardware module 140 would be needed to effectuate the action 120. In some cases, this system 200 inference can be conducted in more complex actions with multiple robots 260 or hardware modules 140.

In some implementations, an alert can be generated at various points in the system 200 when an incompatible part 226 is assigned to a real-time action 120. Components of the system 200 that can receive these alerts can include the client 223*a*, user device 290, server 292, or other devices that can be connected to network 291. In some cases, the system 200 can also implement a response to the alarm, for example, canceling the real-time action 120 or a separate associated action.

In some implementations, an algorithm can be used to generate a plurality of part-actions pairs 293 for a given real-time action 120. This algorithm can be operating on the user device 290, server 292, or incorporated directly into the real-time robotics control system 250. In some cases, the algorithm can determine the most efficient implementation of parts 226 and slots 224 in a part-action pair 293 and propose this solution to a user. In some cases, part-action pairs 293 determined by the algorithm can be shared with external devices over a network 291, for example, user device 290 and server 292. These external devices can then store information relating to the part-action pairs 293.

In some implementations, part-action pairs 293 can be shared over network 291 to a separate robotics control system. The transmitting of the part-action pair 293 from storage can be conducted by any suitable device, for example, user device 290 or server 292. In some cases, the separate robotics control system can have different functionality than real-time robotics control system 250, as long as the parts 226 and slots 224 contained within the shared part-action pair 293 are present. The advantage of this approach is that an efficient part-action pair 293 determined on one real-time robotics control system 250 can be immediately shared with another without any unnecessary experimentation at the recipient system.

Figure 3:
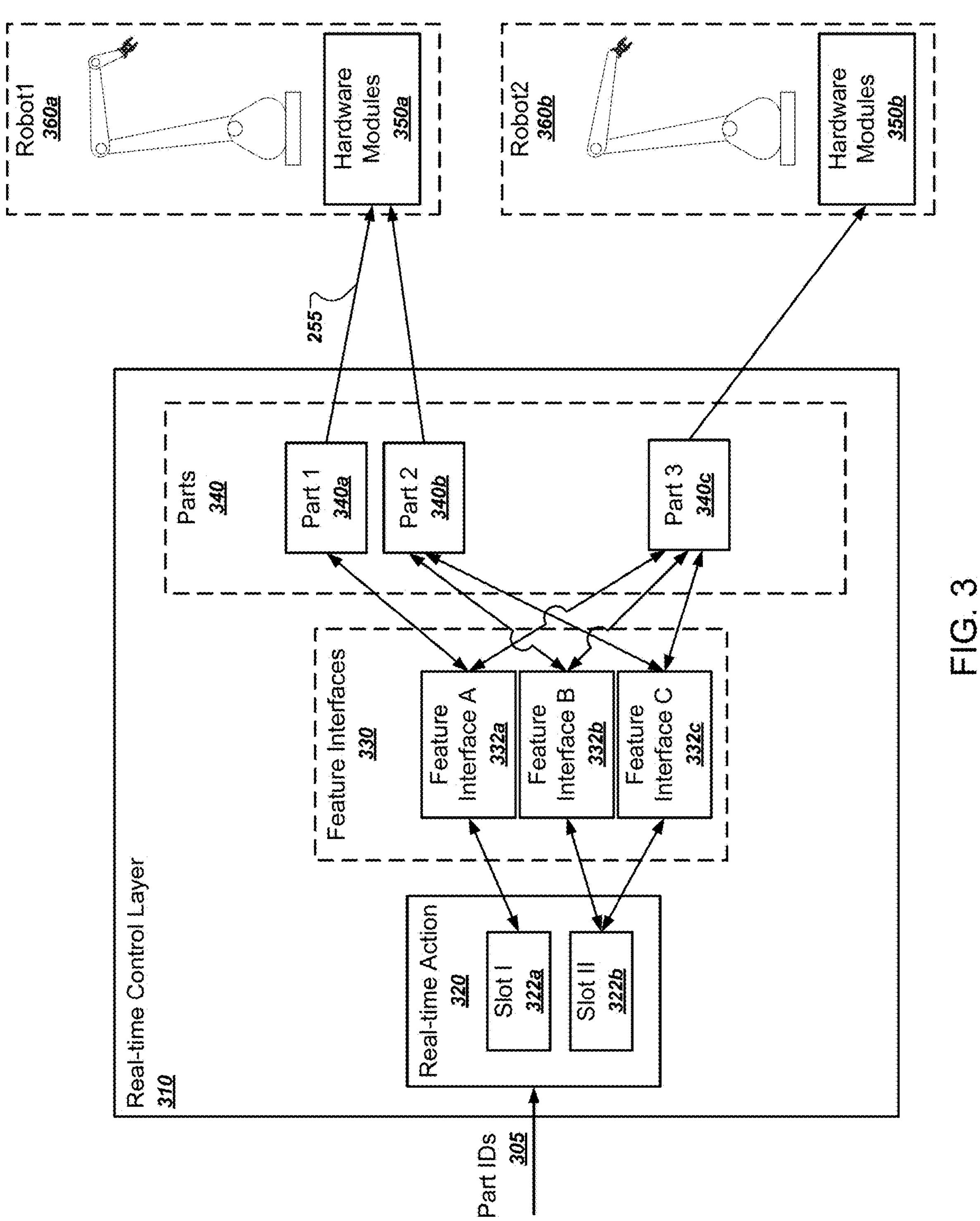
FIG. 3 is diagram of an example real-time control layer.

FIG. 3 is diagram of an example real-time control layer 310. The architecture of the real-time control layer 310 is an example of an architecture that can be used to implement the feature interfaces described in this specification.

The real-time control layer 310 has a real-time action 320 with two example slots 322*a-b*. Each slot defines a collection of one or more feature interfaces that are defined in the global collection of feature interfaces 330. For example, the first slot 322*a* requires a first interface 332*a*, and the second slot 322*b* requires a second feature interface 332*b* and a third feature interface 332*c*.

The functionality represented by each feature interface can be implemented by one or more parts, with each part being a real-time software module that commands one or more underlying hardware subsystems to effectuate the functionality represented by the feature interface. In this example, the global collection of parts 340 includes three software modules: a first 340*a*, a second part 340*b*, and a third part 340*c*.

The first part 340*a* and the second part 340*c* are configured to control a first robot 360*a* by directing one more hardware modules 350*a*. The third part 340*c* is configured to control a different second robot 360*b* using one or more other hardware modules 350*b*. In this specification, a "hardware module" refers to a real-time software system for controlling an underlying hardware subsystem. For example, a hardware module can be real-time software for controlling a physical robotic component, e.g., a moveable component such as a joint of a robot (including the means for moving the joint, e.g., an actuator or a motor), or can alternatively be a tool or a sensor that is used by the robot, or can further alternatively be a peripheral device in the operating environment, e.g., an Ethernet for Control Automation Technology (EtherCAT) enabled device, an Inter-Integrated Circuit (I2C) enabled device, or an Inter-IC Sound (I2S) enabled device.

As in the example above, the first robot 360*a* might be a less sophisticated robot that does not have an integrated force-torque sensor. Rather, a separately installed force-torque sensor can be controlled by the second part 340*b*, while the first part 340*a* can control one or more components of the robot 360*a*.

In contrast, the second robot 360*b* might be a more sophisticated robot that has an integrated force-torque sensor. Thus, a single part 340*c* can control the robot 360*b* and its integrated force-torque sensor.

In either scenario, the same real-time action 320 can be used because of the feature interfaces 330. All that needs to change the part ids 305 that are used to invoke the real-time action 320. In the case of the first robot, the real-time action 320 can be invoked by passing in part ids 305 for the first part 340*a* and the second part 340*b*. In the case of the second robot, the real-time action 320 can be invoked by passing in two instances of the part id 305 for the third part 340*c*.

The feature interfaces 330 also provide increased modularity of the real-time control system. It is easy to see how different entities can collaborate to implement the components of the system. For example, each different robot manufacturer can produce the software for the parts that implement the feature interfaces. Other entities, including third-party robotic software developers, can write custom code for the real-time action that operates by invoking the feature interfaces. Regardless of which robot is used, as long as the feature interfaces are implemented by one or more parts, the same real-time action can be used.

Each part 340 can be a software abstraction of a hardware device in the operating environment and can includes code that effectuates one or more functionalities of the feature interfaces.

The slots 322*a-b* of the real-time action can be used to define compatibility between real-time actions and underlying hardware subsystems. In particular, a part fits into a slot if the part implements all feature interfaces required by the slot.

In some implementations, the real-time robotic control system 250 allows a user to precisely define, i.e., in a configuration file, feature interfaces required by each slot, feature interfaces implemented by each part, and a corresponding mapping between parts and slots that the parts fit into according to the feature interfaces that are required and implemented.

Figure 4:
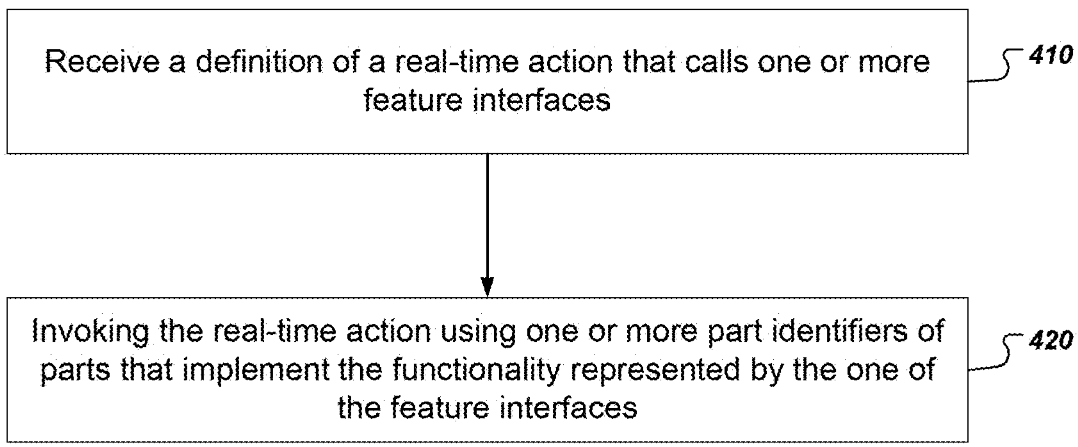
FIG. 4 is a flowchart of an example process for invoking a real-time action using feature interfaces.

FIG. 4 is a flowchart of an example process 400 for invoking a real-time action using feature interfaces. The process 400 can be implemented by one or more computer programs installed on one or more computers and programmed in accordance with this specification. For example, the process 400 can be performed by the real-time robotic control system 250 shown in FIG. 2. For convenience, the process 400 will be described as being performed by a system of one or more computers. In some implementations, the system runs a real-time robotics control framework that is composed of a control stack of multiple levels of software modules, including a hardware abstraction layer which executes within strict real-time requirements, and a real-time control layer which generates continuous real-time control signals can then be consumed by the hardware abstraction layer.

The system receives a definition of a real-time action that calls one or more feature interfaces (410). As described above, the feature interfaces represent functionality implemented by one or more parts, and the real-time action can group the feature interfaces into slots that define which parts are compatible with the slots.

The system invokes the real-time action using one or more part identifiers of parts that implement the functionality represented by the one or more feature interfaces (420). The real-time action can thus use the feature interfaces to invoke the parts that control the hardware subsystems to effectuate the functionality of the feature interfaces.

In some implementations, the system can perform a compatibility check, either at run-time or at staging time. The compatibility check determines whether the part identifiers for each slot actually identify parts that fit into the slot by virtue of implementing all feature interfaces required by the slot. If not, the system can raise an error, either during run-time or earlier, e.g., at compile time or staging time.

Embodiments of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible non-transitory storage medium for execution by, or to control the operation of, data processing apparatus. The computer storage medium can be a machine-readable storage device, a machine-readable storage substrate, a random or serial access memory device, or a combination of one or more of them. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus.

The term "data processing apparatus" refers to data processing hardware and encompasses all kinds of apparatus, devices, and machines for processing data, including by way of example a programmable processor, a computer, or multiple processors or computers. The apparatus can also be, or further include, special purpose logic circuitry, e.g., an FPGA (field programmable gate array) or an ASIC (application-specific integrated circuit). The apparatus can optionally include, in addition to hardware, code that creates an operating environment for computer programs, e.g., code that constitutes processor firmware, a protocol stack, a database management system, an operating system, or a combination of one or more of them.

A computer program which may also be referred to or described as a program, software, a software application, an app, a module, a software module, a script, or code) can be written in any form of programming language, including compiled or interpreted languages, or declarative or procedural languages, and it can be deployed in any form, including as a stand-alone program or as a module, component, subroutine, or other unit suitable for use in a computing environment. A program may but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub-programs, or portions of code. A computer program can be deployed to be executed on one computer or on multiple computers that are located at one site or distributed across multiple sites and interconnected by a data communication network.

For a system of one or more computers to be configured to perform particular operations or actions means that the system has installed on it software, firmware, hardware, or a combination of them that in operation cause the system to perform the operations or actions. For one or more computer programs to be configured to perform particular operations or actions means that the one or more programs include instructions that, when executed by data processing apparatus, cause the apparatus to perform the operations or actions.

As used in this specification, an "engine," or "software engine," refers to a software implemented input/output system that provides an output that is different from the input. An engine can be an encoded block of functionality, such as a library, a platform, a software development kit ("SDK"), or an object. Each engine can be implemented on any appropriate type of computing device, e.g., servers, mobile phones, tablet computers, notebook computers, music players, e-book readers, laptop or desktop computers, PDAs, smart phones, or other stationary or portable devices, that includes one or more processors and computer readable media. Additionally, two or more of the engines may be implemented on the same computing device, or on different computing devices.

The processes and logic flows described in this specification can be performed by one or more programmable computers executing one or more computer programs to perform functions by operating on input data and generating output. The processes and logic flows can also be performed by special purpose logic circuitry, e.g., an FPGA or an ASIC, or by a combination of special purpose logic circuitry and one or more programmed computers.

Computers suitable for the execution of a computer program can be based on general or special purpose microprocessors or both, or any other kind of central processing unit. Generally, a central processing unit will receive instructions and data from a read-only memory or a random access memory or both. The essential elements of a computer are a central processing unit for performing or executing instructions and one or more memory devices for storing instructions and data. The central processing unit and the memory can be supplemented by, or incorporated in, special purpose logic circuitry. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few.

Computer-readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and pointing device, e.g., a mouse, trackball, or a presence sensitive display or other surface by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's device in response to requests received from the web browser. Also, a computer can interact with a user by sending text messages or other forms of message to a personal device, e.g., a smartphone, running a messaging application, and receiving responsive messages from the user in return.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface, a web browser, or an app through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network (LAN) and a wide area network (WAN), e.g., the Internet.

The computing system can include clients and servers. A client and server are generally remote from each other and typically interact through a communication network. The relationship of client and server arises by virtue of computer programs running on the respective computers and having a client-server relationship to each other. In some embodiments, a server transmits data, e.g., an HTML page, to a user device, e.g., for purposes of displaying data to and receiving user input from a user interacting with the device, which acts as a client. Data generated at the user device, e.g., a result of the user interaction, can be received at the server from the device.

In addition to the embodiments described above, the following embodiments are also innovative:

Embodiment 1 is a method performed by a real-time robotics control system, the method comprising: receiving a definition of a real-time action to be executed by the real-time robotics control system to control a robot using one or more underlying hardware subsystems, wherein the real-time action calls one or more feature interfaces that represent respective functionalities implemented by the one or more underlying hardware subsystems, and wherein the functionalities represented by the one or more feature interfaces are implemented by one or more parts, each part being a real-time software module that controls one or more of the underlying hardware subsystems; and invoking the real-time action including providing a respective part identifier of a part for each of the one or more feature interfaces called by the real-time action.

Embodiment 2 is the method of embodiment 1, further comprising invoking the same real-time action on a different robotic system including providing different respective identifiers for one or more parts that control the different robotic system.

Embodiment 3 is the method of embodiment 1, wherein the same real-time action can be invoked with a same part identifier for multiple different feature interfaces or different part identifiers for the multiple different feature interfaces.

Embodiment 4 is the method of embodiment 1, wherein the real-time action groups the feature interfaces into one or more slots, wherein each slot is mapped to a particular part, and wherein each slot represents a collection of feature interfaces that are required to be implemented by a particular part in order to effectuate the real-time action.

Embodiment 5 is the method of embodiment 4, further comprising: receiving a request to invoke the real-time action using a particular part identifier; determining that the particular part having the particular part identifier does not implement all feature interfaces of a particular slot; and in response, raising an error indicating that the part is not compatible with the real-time action.

Embodiment 6 is the method of embodiment 1, wherein invoking the real-time action causes the real-time action to provide commands to the parts to control the underlying hardware subsystems thereby effectuating the functionality represented by the feature interfaces.

Embodiment 7 is the method of embodiment 1, wherein executing the real-time action further comprises: determining, a selection of parts that correspond to a real-time action; generating, a plurality of part-action pairs; and selecting, from the plurality of part-action pairs, a part-action pair that contains feature interfaces that can effectuate the real-time action.

Embodiment 8 is the method of embodiment 1, further comprising generating an alert when an incompatible part is assigned to a real-time action.

Embodiment 9 is a system comprising: a real-time robotics control system and one or more computers and one or more storage devices storing instructions that are operable, when executed by the one or more computers, to cause the one or more computers to perform operations comprising: receiving a definition of a real-time action to be executed by the real-time robotics control system to control a robot using one or more underlying hardware subsystems, wherein the real-time action calls one or more feature interfaces that represent respective functionalities implemented by the one or more underlying hardware subsystems, and wherein the functionalities represented by the one or more feature interfaces are implemented by one or more parts, each part being a real-time software module that controls one or more of the underlying hardware subsystems; and invoking the real-time action including providing a respective part identifier of a part for each of the one or more feature interfaces called by the real-time action.

Embodiment 10 is the system of embodiment 9, further comprising: invoking the same real-time action on a different robotic system including providing different respective identifiers for one or more parts that control the different robotic system.

Embodiment 11 is the system of embodiment 9, wherein the same real-time action can be invoked with a same part identifier for multiple different feature interfaces or different part identifiers for the multiple different feature interfaces.

Embodiment 12 is the system of embodiment 9, wherein the real-time action groups the feature interfaces into one or more slots, wherein each slot is mapped to a particular part, and wherein each slot represents a collection of feature interfaces that are required to be implemented by a particular part in order to effectuate the real-time action.

Embodiment 13 is the system of embodiment 12, further comprising: receiving a request to invoke the real-time action using a particular part identifier; determining that the particular part having the particular part identifier does not implement all feature interfaces of a particular slot; and in response, raising an error indicating that the part is not compatible with the real-time action.

Embodiment 14 is the system of embodiment 9, wherein invoking the real-time action causes the real-time action to provide commands to the parts to control the underlying hardware subsystems thereby effectuating the functionality represented by the feature interfaces.

Embodiment 15 is the system of embodiment 9, wherein executing the real-time action further comprises: determining, a selection of parts that correspond to a real-time action; generating, a plurality of part-action pairs; and selecting, from the plurality of part-action pairs, a part-action pair that contains feature interfaces that can effectuate the real-time action.

Embodiment 16 is the system of embodiment 9, further comprising generating an alert when an incompatible part is assigned to a real-time action.

Embodiment 17 is one or more non-transitory computer storage media encoded with computer program instructions that when executed by one or more computers cause the one or more computers to perform operations comprising: receiving a definition of a real-time action to be executed by a real-time robotics control system to control a robot using one or more underlying hardware subsystems, wherein the real-time action calls one or more feature interfaces that represent respective functionalities implemented by the one or more underlying hardware subsystems, and wherein the functionalities represented by the one or more feature interfaces are implemented by one or more parts, each part being a real-time software module that controls one or more of the underlying hardware subsystems; and invoking the real-time action including providing a respective part identifier of a part for each of the one or more feature interfaces called by the real-time action.

Embodiment 18 is the media of embodiment 17, further comprising: invoking the same real-time action on a different robotic system including providing different respective identifiers for one or more parts that control the different robotic system.

Embodiment 19 is the media of embodiment 17, wherein the same real-time action can be invoked with a same part identifier for multiple different feature interfaces or different part identifiers for the multiple different feature interfaces.

Embodiment 20 is the media of embodiment 17, wherein the real-time action groups the feature interfaces into one or more slots, wherein each slot is mapped to a particular part, and wherein each slot represents a collection of feature interfaces that are required to be implemented by a particular part in order to effectuate the real-time action.

While this specification contains many specific implementation details, these should not be construed as limitations on the scope of any invention or on the scope of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination.

Moreover, although features may be described above as acting in certain combinations and even initially be claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In certain some cases, multitasking and parallel processing may be advantageous.

What is claimed is:

1. A method performed by a real-time robotics control system, the method comprising:
  - receiving a definition of a real-time action to be executed by the real-time robotics control system to control a robot using one or more underlying hardware subsystems,
    - wherein the real-time action calls one or more feature interfaces that represent respective functionalities implemented by the one or more underlying hardware subsystems,
    - wherein the real-time action groups the feature interfaces into one or more slots, wherein each slot is mapped to a particular part, and wherein each slot represents a collection of feature interfaces that are required to be implemented by a particular part in order to effectuate the real-time action, and
    - wherein the functionalities represented by the one or more feature interfaces are implemented by one or more parts, each part being a real-time robotics component software module that controls one or more of the underlying hardware subsystems; and
  - invoking the real-time action including providing a respective part identifier of a part for each of the one or more feature interfaces called by the real-time action.

2. The method of claim 1, further comprising:
  - invoking the same real-time action on a different robotic system including providing different respective identifiers for one or more parts that control the different robotic system.

3. The method of claim 1, wherein the same real-time action can be invoked with a same part identifier for multiple different feature interfaces or different part identifiers for the multiple different feature interfaces.

4. The method of claim 1, further comprising:
  - receiving a request to invoke the real-time action using a particular part identifier;
  - determining that the particular part having the particular part identifier does not implement all feature interfaces of a particular slot; and
  - in response, raising an error indicating that the part is not compatible with the real-time action.

5. The method of claim 1, wherein invoking the real-time action causes the real-time action to provide commands to the parts to control the underlying hardware subsystems thereby effectuating the functionality represented by the feature interfaces.

6. The method of claim 1, further comprising generating an alert when an incompatible part is assigned to a real-time action.

7. A system comprising: a real-time robotics control system and one or more computers and one or more storage devices storing instructions that are operable, when executed by the one or more computers, to cause the one or more computers to perform operations comprising:
  - receiving a definition of a real-time action to be executed by the real-time robotics control system to control a robot using one or more underlying hardware subsystems,
    - wherein the real-time action calls one or more feature interfaces that represent respective functionalities implemented by the one or more underlying hardware subsystems,
    - wherein the real-time action groups the feature interfaces into one or more slots, wherein each slot is mapped to a particular part, and wherein each slot represents a collection of feature interfaces that are required to be implemented by a particular part in order to effectuate the real-time action, and
    - wherein the functionalities represented by the one or more feature interfaces are implemented by one or more parts, each part being a real-time robotics component software module that controls one or more of the underlying hardware subsystems; and
  - invoking the real-time action including providing a respective part identifier of a part for each of the one or more feature interfaces called by the real-time action.

8. The system of claim 7, further comprising:
  - invoking the same real-time action on a different robotic system including providing different respective identifiers for one or more parts that control the different robotic system.

9. The system of claim 7, wherein the same real-time action can be invoked with a same part identifier for multiple different feature interfaces or different part identifiers for the multiple different feature interfaces.

10. The system of claim 7, further comprising:
  - receiving a request to invoke the real-time action using a particular part identifier;
  - determining that the particular part having the particular part identifier does not implement all feature interfaces of a particular slot; and
  - in response, raising an error indicating that the part is not compatible with the real-time action.

11. The system of claim 7, wherein invoking the real-time action causes the real-time action to provide commands to the parts to control the underlying hardware subsystems thereby effectuating the functionality represented by the feature interfaces.

12. The system of claim 7, further comprising generating an alert when an incompatible part is assigned to a real-time action.

13. One or more non-transitory computer storage media encoded with computer program instructions that when executed by one or more computers cause the one or more computers to perform operations comprising:

receiving a definition of a real-time action to be executed by a real-time robotics control system to control a robot using one or more underlying hardware subsystems, wherein the real-time action calls one or more feature interfaces that represent respective functionalities implemented by the one or more underlying hardware subsystems, wherein the real-time action groups the feature interfaces into one or more slots, wherein each slot is mapped to a particular part, and wherein each slot represents a collection of feature interfaces that are required to be implemented by a particular part in order to effectuate the real-time action, and wherein the functionalities represented by the one or more feature interfaces are implemented by one or more parts, each part being a real-time robotics component software module that controls one or more of the underlying hardware subsystems; and invoking the real-time action including providing a respective part identifier of a part for each of the one or more feature interfaces called by the real-time action.

14. The media of claim 13, further comprising:

invoking the same real-time action on a different robotic system including providing different respective identifiers for one or more parts that control the different robotic system.

15. The media of claim 13, wherein the same real-time action can be invoked with a same part identifier for multiple different feature interfaces or different part identifiers for the multiple different feature interfaces.

16. A method performed by a real-time robotics control system, the method comprising:

receiving a definition of a real-time action to be executed by the real-time robotics control system to control a robot using one or more underlying hardware subsystems, wherein the real-time action calls one or more feature interfaces that represent respective functionalities implemented by the one or more underlying hardware subsystems, and wherein executing the real-time action further comprises:

determining, a selection of parts that correspond to a real-time action;

generating, a plurality of part-action pairs; and selecting, from the plurality of part-action pairs, a part-action pair that contains feature interfaces that can effectuate the real-time action, and wherein the functionalities represented by the one or more feature interfaces are implemented by one or more parts, each part being a real-time robotics component software module that controls one or more of the underlying hardware subsystems; and invoking the real-time action including providing a respective part identifier of a part for each of the one or more feature interfaces called by the real-time action.

17. The method of claim 16, further comprising:

invoking the same real-time action on a different robotic system including providing different respective identifiers for one or more parts that control the different robotic system.

18. The method of claim 16, wherein the same real-time action can be invoked with a same part identifier for multiple different feature interfaces or different part identifiers for the multiple different feature interfaces.

19. A system comprising: a real-time robotics control system and one or more computers and one or more storage devices storing instructions that are operable, when executed by the one or more computers, to cause the one or more computers to perform operations comprising:

receiving a definition of a real-time action to be executed by the real-time robotics control system to control a robot using one or more underlying hardware subsystems, wherein the real-time action calls one or more feature interfaces that represent respective functionalities implemented by the one or more underlying hardware subsystems, and wherein executing the real-time action further comprises:

determining, a selection of parts that correspond to a real-time action;

generating, a plurality of part-action pairs; and selecting, from the plurality of part-action pairs, a part-action pair that contains feature interfaces that can effectuate the real-time action, and wherein the functionalities represented by the one or more feature interfaces are implemented by one or more parts, each part being a real-time robotics component software module that controls one or more of the underlying hardware subsystems; and invoking the real-time action including providing a respective part identifier of a part for each of the one or more feature interfaces called by the real-time action.

20. The system of claim 19, further comprising:

invoking the same real-time action on a different robotic system including providing different respective identifiers for one or more parts that control the different robotic system.

* * * * *